United States Patent
Onopchenko et al.

[15] 3,692,828
[45] Sept. 19, 1972

[54] PROCESS FOR PREPARING PHENYL SULFONE CARBOXYLIC ACIDS

[72] Inventors: Antoli Onopchenko, Monroeville; Johann G. D. Schulz, Pittsburgh, both of Pa.

[73] Assignee: Gulf Research & Development Company, Pittsburgh, Pa.

[22] Filed: May 1, 1970

[21] Appl. No.: 33,945

[52] U.S. Cl. ............................................. 260/524 R
[51] Int. Cl. ............................................... C07c 63/02
[58] Field of Search ................................. 260/524 R

[56] References Cited
UNITED STATES PATENTS

| | | |
|---|---|---|
| 2,673,218 | 3/1954 | Caldwell....................260/524 |
| 3,334,135 | 8/1967 | Ichikawa....................260/524 |
| 3,431,296 | 3/1969 | Ichikawa et al............260/524 |

*Primary Examiner*—Lorraine A. Weinberger
*Assistant Examiner*—R. S. Weissberg
*Attorney*—Meyer Neishloss, Deane E. Keith and Joseph J. Carducci

[57] ABSTRACT

A process for preparing phenyl sulfone carboxylic acids which involves contacting an alkyl phenyl sulfone with molecular oxygen while the same is dissolved in a lower carboxylic acid containing cobaltic ions.

8 Claims, No Drawings

PROCESS FOR PREPARING PHENYL SULFONE CARBOXYLIC ACIDS

This invention relates to a process for preparing phenyl sulfone carboxylic acids.

The preparation of phenyl sulfone carboxylic acids from an alkyl phenyl sulfone using oxidation techniques is considered to be exceedingly difficult, as evidenced by Caldwell in U. S. Pat. No. 2,673,218, dated March 23, 1954, and Bennett et al. in U. S. Pat. No. 3,022,320 dated Feb. 20, 1962. When oxidation of p-tolyl sulfone was attempted at various temperature levels in the absence of activators in the Caldwell patent, the methyl groups remained unaffected. Caldwell stated that such oxidation would go only in the presence of a lower aliphatic unsubstituted aldehyde, and that its presence was necessary throughout the reaction period. Bennett et al. attempted the oxidation by using nitric acid as a chemical oxidant.

We have found that neither an aldehyde nor nitric acid is required in the defined process, provided the alkyl phenyl sulfone is contacted with molecular oxygen while the same is dissolved in a lower carboxylic acid containing cobalt in the form of cobaltic ions.

The alkyl phenyl sulfone that is oxidized herein can be represented by the following formula:

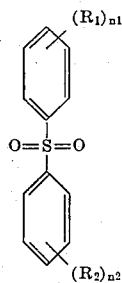

wherein $R_1$ and $R_2$ are selected from alkyl substituents having from one to 10 carbon atoms, preferably methyl, $n_1$ is an integer from 0 to 5, preferably 1, and $n_2$ is an integer from 1 to 5, preferably 1. Specific examples of alkyl phenyl sulfones that can be used include p-tolyl sulfone, α-tolyl sulfone, m-tolyl sulfone, 3,4-dimethylphenyl sulfone, 2,4-dimethylphenyl sulfone, 3-amylphenyl-3,4-diethylphenyl sulfone, 2,3,4-trioctylphenyl, phenyl sulfone, p-decylphenyl sulfone, 2,3,4,5,6-pentamethylphenyl-2butylphenyl sulfone, etc. Of these we prefer to employ p-tolyl sulfone.

In order to convert the alkyl phenyl sulfone defined above to a phenyl sulfone carboxylic acid, it is necessary to bring the same into contact with molecular oxygen, sufficient in an amount at least stoichiometrically to convert at least one of the alkyl substituents on the alkyl phenyl sulfone to a carboxylic acid group. Preferably, the amount of molecular oxygen employed, on a molar basis, will be from about one to about 100 times the amount stoichiometrically required to convert an alkyl substituent to a carboxylic acid group. The contact with molecular oxygen is effected while the alkyl phenyl sulfone is dissolved in a lower carboxylic acid solvent having from two to six carbon atoms, preferably from two to four carbon atoms. Specific examples of such carboxylic acids are acetic acid, propionic acid, butyric acid, valeric acid, caproic acid, etc. Of these, we prefer to employ acetic acid. The amount of carboxylic acid used can vary over a wide range, but on a weight basis, relative to the alkyl phenyl sulfone, can be from about 2:1 to about 50:1, preferably from about 10:1 to about 20:1.

The only additional material required to effect desired oxidation of alkyl phenyl sulfone is cobalt and it is critical that for the same to be effective as catalyst that it be in the form of cobaltic ions. Cobalt can be in any form, but is preferably used as a salt soluble in the reaction mixture. Thus, the cobalt compound can be in the form of an inorganic compound or as an organic compound, for example, as a cobaltous or cobaltic chloride, sulfate, nitrate, acetate, propionate, butyrate, isovalerate, benzoate, toluate, naphthenate, salicylate, acetyl acetonate, etc. In the event a cobaltic compound is employed, cobaltic ions are immediately present and the desired oxidation reaction, as defined above, can begin. If a cobaltous compound is employed, it is imperative that cobaltous ions in solution be converted to cobaltic ions before reaction can occur. This can be effected in any suitable or convenient manner. For example, if cobaltous acetate tetrahydrate is used, it can first be dissolved in the lower carboxylic acid, and while the solution is maintained at an elevated temperature, which can be from about 50° to about 500° C., molecular oxygen is passed therethrough until cobaltous ions are converted to cobaltic ions. The alkyl phenyl sulfone that is to be subjected to oxidation is then introduced into the solution and the procedure described above is then begun. The amount of cobalt compound employed, as cobalt, relative to carboxylic acid, on a weight basis, can be from about 0.1 percent to about 10 percent, preferably from about 0.5 percent to about 5 percent.

The reaction conditions employed herein are mild. Thus, the temperature can be in the range of about 50° to about 200° C., preferably about 80° to about 125° C., and the pressure desirably in the range of about atmospheric to about 5000 pounds per square inch gauge, preferably about 100 to about 500 pounds per square inch gauge. The residence time depends on the amount of oxidation desired, but generally can be in the range of about 1 minute to about 60 hours, preferably about one to about 30 hours.

Recovery of phenyl sulfone carboxylic acids can be effected in a simple manner, since the same are insoluble in the reaction product. Thus, the reaction product can be filtered and the solids washed with water to remove catalyst and lower carboxylic acid therefrom.

The process defined and claimed herein can further be illustrated by the following.

EXAMPLE I

That the desired reaction will not proceed in the presence of cobaltous ions is apparent from the present run. Into an autoclave there was placed 420 grams of glacial acetic acid, 25.2 grams of cobaltous acetate tetrahydrate and 42.3 grams of p-tolyl sulfone. The autoclave was then brought to a temperature of 105° C. and an oxygen pressure of 335 pounds per square inch gauge and maintained under these conditions for a period of 28 hours. At the end of this time the autoclave was cooled, depressured and its contents drained. Filtration of the crude material resulted in 39.0 grams of a white solid which was washed several times with water and dried in a vacuum oven. The filtrate was pink in color, indicating the presence of cobaltous ions. The product failed to dissolve in aqueous sodium hydroxide, and did not indicate the presence of acids by infrared or gas chromatography. Only one sharp peak was obtained on the chromatogram for the p-tolyl sulfone starting material. Thus, no reaction occurred.

The above should be contrasted with the results obtained below.

EXAMPLE II

Into a glass flask there was placed 400 grams of glacial acetic acid and 25 grams of cobaltous acetate tetrahydrate. The solution was heated to 100° C. at atmospheric pressure while a steady stream of molecular oxygen at the rate of about 4 to 6 liters per hour was passed therethrough. At the end of 24 hours the solution started to change from pink to a dark plum color, indicating the presence of some cobaltic ions therein. Continuing this procedure will change the color of the solution to a dark green. The presence of cobaltic ion ($Co^{+++}$) as the effective species was detected by the appearance of a green color in acetic acid solution, by its ability to oxidize water to oxygen and to liberate free iodine from potassium iodide solution, which was readily detected with a starch indicator, as well as the appearance of an absorption band at about 605 millimicrons in the recording ultraviolet spectrum, along with its charge transfer band at a higher wavelength. The catalyst solution was cooled, transferred to a 1 liter, 316-stainless steel, magnetically-stirred autoclave, and 50 grams of p-tolyl sulfone was added thereto. The autoclave was heated to 105° C. and pressured to 300 pounds per square inch gauge with molecular oxygen. While maintaining these conditions, the oxidation was permitted to proceed for 8.5 hours, after which the autoclave was cooled, depressured and its contents removed. The dark green solution containing some solids was filtered, and the solids were washed with water several times to remove catalyst and acetic acid therefrom and then dried. A total of 51.8 grams of white solid material was thus obtained. Chromatographic analysis indicated a 63 percent molar yield to the mono acid, p-carboxyphenyl, p-tolyl sulfone and a 25 percent molar yield to p-phenyl sulfone dicarboxylic acid. The mono acid was separated from the di-acid by extraction with acetone.

EXAMPLE III

The dark green filtrate from EXAMPLE II was charged to the autoclave with 38 grams of p-tolyl sulfone. The autoclave was brought to the same operating conditions as EXAMPLE II and the reaction was permitted to proceed for 2.5 hours. The autoclave was then cooled, depressured and drained. Filtration of the product mixture resulted in 35 grams of a white solid, which by gas chromatographic analysis indicated the presence of 70 percent by weight of the mono-acid and 30 percent of unreacted sulfone. To continue the oxidation, the entire solid product and the dark green filtrate were charged back into the autoclave and reaction was permitted to continue as before for an additional 14 hours. Work-up of the product resulted in the recovery of 45.7 grams of white solids. Gas chromatographic analysis indicated that the product consisted of 47 percent by weight of the mono-acid and 53 percent by weight of the desired di-acid, p-phenyl sulfone dicarboxylic acid. This indicates a molar yield of about 51 percent to the desired di-acid. It is estimated that a total of 20 to 30 hours would be sufficient to convert all of the material herein to desired di-acid.

The above clearly demonstrates that the desired oxidation of alkyl phenyl sulfone to phenyl sulfone carboxylic acid can proceed successfully when the only necessary components in the reaction system are alkyl phenyl sulfone, molecular oxygen, a lower carboxylic acid and cobaltic ions.

Obviously, many modifications and variations of the invention, as hereinabove set forth, can be made without departing from the spirit and scope thereof, and therefore only such limitations should be imposed as are indicated in the appended claims.

We claim:

1. A process for preparing phenyl sulfone carboxylic acids which comprises contacting an alkyl phenyl sulfone with molecular oxygen while the same is dissolved in a lower carboxylic acid containing cobaltic ions in the absence of added aldehyde, said cobaltic ions being present throughout the reaction period.

2. The process of claim 1 wherein said alkyl phenyl sulfone contains an alkyl substituent on each ring.

3. The process of claim 1 wherein said alkyl phenyl sulfone contains a methyl substituent on each ring.

4. The process of claim 1 wherein said alkyl phenyl sulfone is p-tolyl sulfone.

5. The process of claim 1 wherein the reaction temperature is in the range of about 50° to about 200° C.

6. The process of claim 1 wherein the reaction temperature is in the range of about 80° to about 125° C.

7. The process of claim 1 wherein said lower carboxylic acid is acetic acid.

8. The process of claim 1 wherein said cobaltic ions are obtained by first dissolving cobaltous acetate tetrahydrate in acetic acid and then passing molecular oxygen therethrough, after which said alkyl phenyl sulfone is added to the reaction mixture.

* * * * *